April 7, 1953
C. SKLAREK
2,634,364
POSITION CONTROL MEANS AND SWITCH
FOR DIRIGIBLY MOUNTED SPOTLIGHT
Filed Aug. 25, 1949
3 Sheets-Sheet 1
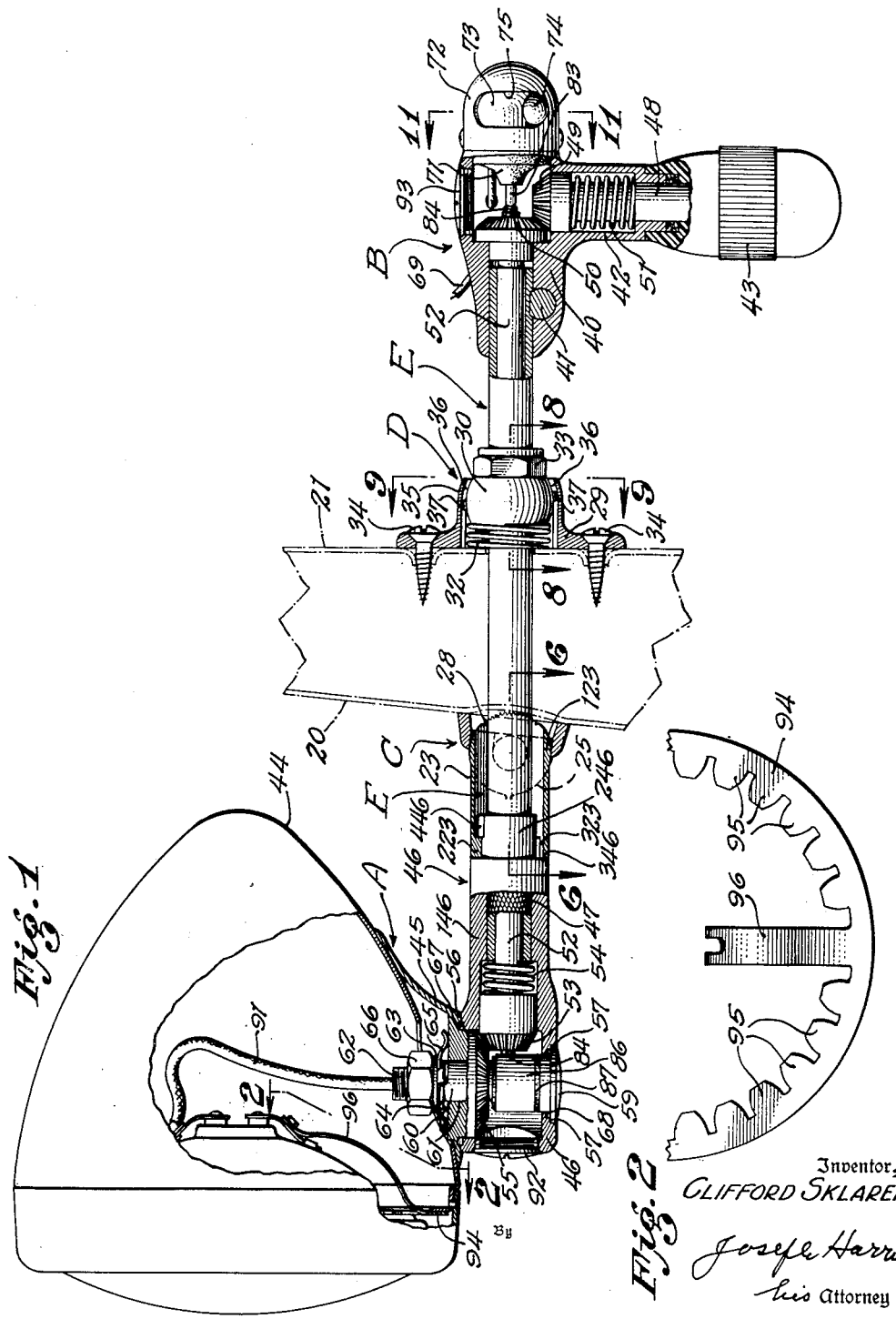
Inventor,
CLIFFORD SKLAREK
Joseph Harris
his Attorney April 7, 1953
C. SKLAREK
2,634,364
POSITION CONTROL MEANS AND SWITCH
FOR DIRIGIBLY MOUNTED SPOTLIGHT
Filed Aug. 25, 1949
3 Sheets-Sheet 2
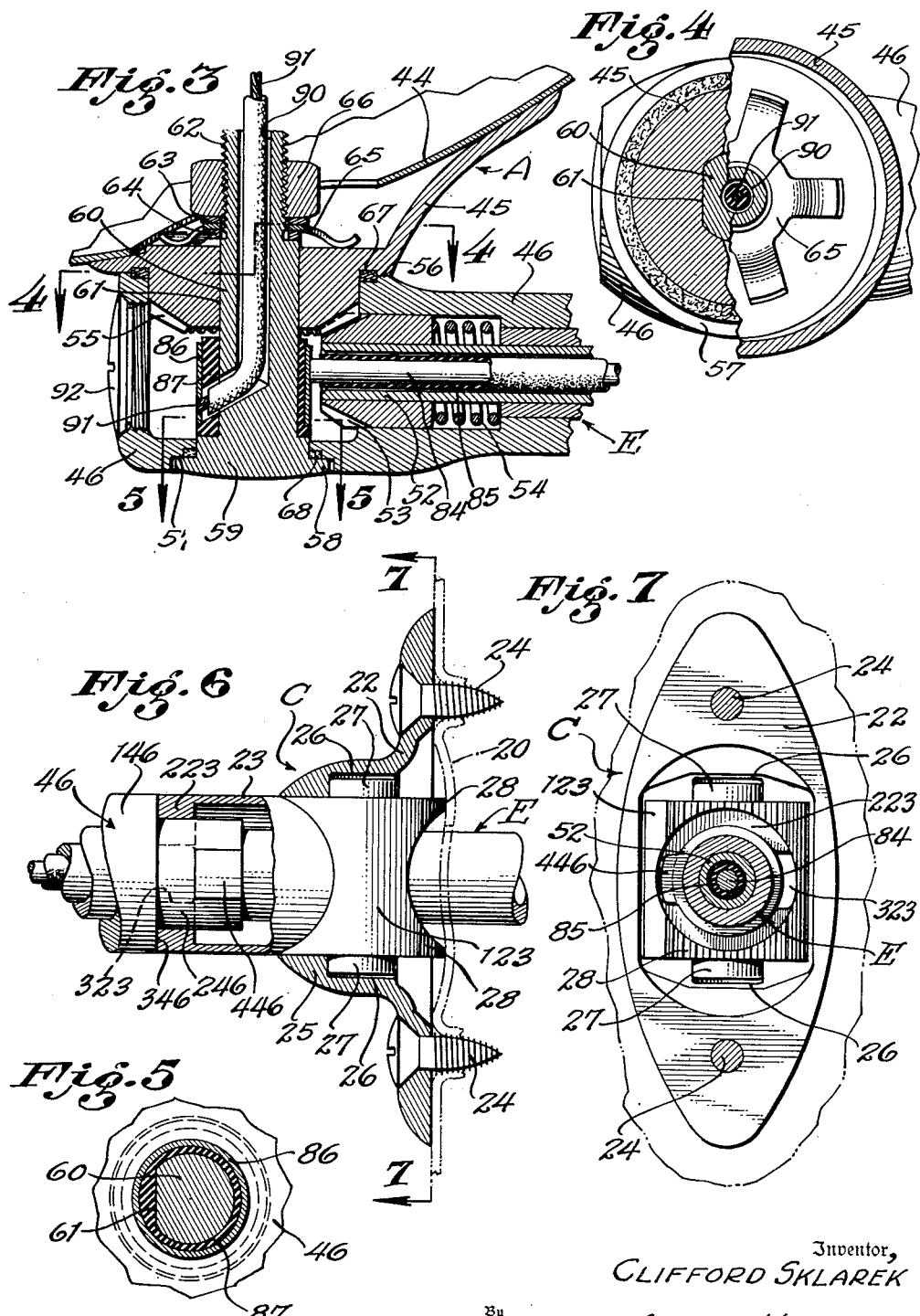
Inventor,
CLIFFORD SKLAREK
By Joseph Harris
his Attorney

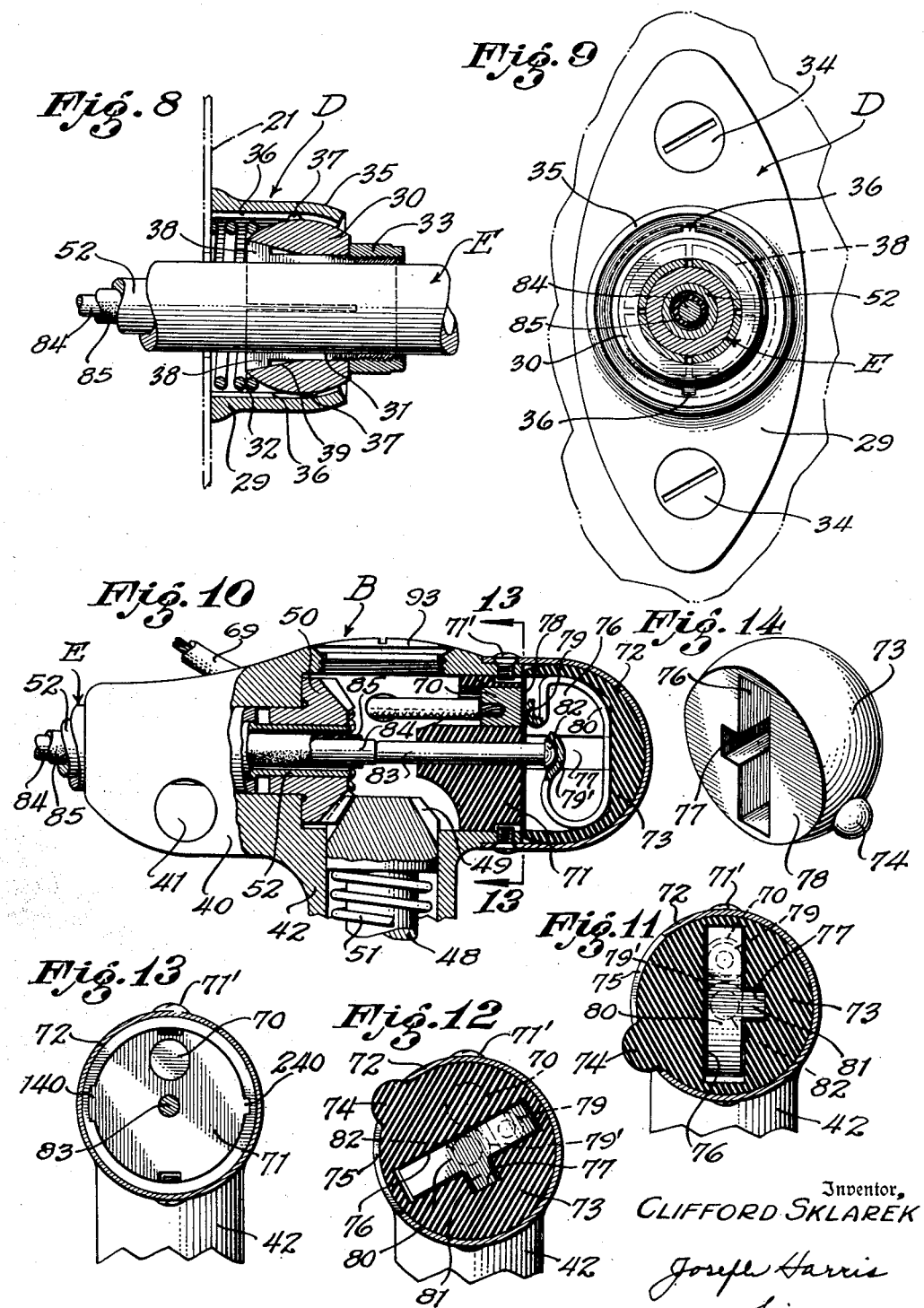

Patented Apr. 7, 1953

2,634,364

UNITED STATES PATENT OFFICE 2,634,364

POSITION CONTROL MEANS AND SWITCH
FOR DIRIGIBLY MOUNTED SPOTLIGHT

Clifford Sklarek, Los Angeles, Calif.

Application August 25, 1949, Serial No. 112,263

5 Claims. (Cl. 240—61.13)

This invention relates to improvements in dirigibly mounted lights and, more specifically, lights of that type wherein the adjustable lamp head is located exteriorly of, and the operating handle interiorly of, the body or other support on which mounted, such lights being commonly referred to as spotlights and used most frequently on automotive vehicles, marine vessels and other structures.

In the case of automotive vehicles, particularly passenger cars, radical changes in the structural features of the windshield, door posts and body have taken place in recent years so that, today, it is impossible, on many cars, to mount a dirigible light through the door post as heretofore common and it has become necessary to adapt the light mounting or attaching means for application to the car doors in many cases.

As known to those skilled in the art, it is highly desirable that the axis about which the light, considered as a whole, is tilted or rotated be disposed horizontally. Due, however, to the wide variation in present day car body and car door structures great difficulty has heretofore been encountered in attaining this desired mounting by the prior known attaching or mounting bracket systems.

One object of the present invention, therefore, is to provide improved universal attaching or mounting bracket means such that, regardless of the deviation from the vertical of either or both the inner and outer surfaces of that portion of the vehicle to which the light is secured, the light turning or tilting shaft may be retained in the desired position for rotation about a horizontal axis.

A further object of the invention is to provide, in conjunction with bracket attaching means of the character indicated in the preceding paragraph, simplified adjustable friction means for automatically holding the tilting shaft and parts carried thereby, in any adjusted rotated position.

Another object of the invention is to provide, in a dirigible light of the character hereinbefore indicated, an electrical contact system between the inside operating handle unit and the outside rotatable lamp head, which is radically improved over prior systems with respect to the reduced number of parts; the ease of assembling; automatic compensation for any wear; and unlimited turning capacity of the lamp head on the light tilting shaft.

A more specific object of the invention is to provide, in conjunction with the electrical system indicated in the preceding paragraph, a single spring which embodies a plurality of functions including a make and break switch and automatic maintenance of commutator contact for the lamp head.

Still other objects of the invention are; to provide a dirigibly mounted light comprised of a greatly reduced number of parts compared to prior dirigibly mounted lights and which parts may be easily assembled whereby to reduce the cost of the light; to provide more substantial and rugged bearings for the rotatable lamp head; to provide means insuring maintenance of a constant degree of friction for the rotatable lamp head; and to provide simple and inexpensive means to minimize danger of glass breakage of the light proper due to heat expansion.

Other objects of the invention will more clearly appear from the description hereinafter following, taken in connection with the drawings in which Fig. 1 is a part elevational view, part vertical longitudinal sectional view of a dirigibly mounted light incorporating what is now considered the preferred embodiment of the invention, parts being also broken away to better illustrate certain details of construction. Fig. 2 is a partial, elevational view, corresponding to line 2—2 of Fig. 1 illustrating a yieldable support for the glass of a sealed beam light mounted in the lamp head. Fig. 3 is a vertical sectional view, enlarged, of a portion of the lamp head supporting, rotating and commutator details, the section being diametrical of the lamp head axis and longitudinal of the rotating shaft. Figs. 4 and 5 are horizontal sectional views corresponding to lines 4—4 and 5—5, respectively, of Fig. 3. Fig. 6 is a horizontal sectional view, enlarged, corresponding to line 6—6 of Fig. 1. Fig. 7 is a vertical sectional view corresponding to line 7—7 of Fig. 6. Fig. 8 is a horizontal longitudinal sectional view, enlarged, corresponding to line 8—8 of Fig. 1. Fig. 9 is a vertical sectional view, enlarged, corresponding to line 9—9 of Fig. 1. Fig. 10 is an enlarged, longitudinal vertical sectional view of the construction in the handle unit, the section being taken through the axes of the gearing. Fig. 11 is a vertical sectional view, enlarged, corresponding to line 11—11 of Fig. 1 showing the "on" position of the switch. Fig. 12 is a view similar to Fig. 11 but showing the switch in the "off" position. Fig. 13 is a vertical sectional view corresponding to line 13—13 of Fig. 10. And Fig. 14 is a detail perspective of a knob employed in the switch means.

In said drawings, the improved light comprises, broadly, an outer lamp head A; and inner handle unit B; outer and inner bracket units or assemblies C and D; a combined light supporting and tilting or rotating shaft E together with the electrical, rotating and other devices hereinafter described.

The shaft E, as will be understood, is the member of the light to which is secured the lamp head unit A at its outer end and the handle unit B at its inner end and which is disposed horizontally so that the entire dirigible light is tiltable or rotatable about a horizontal axis. As shown, the improved light is mounted on a car door having outer and inner, spaced walls 20 and 21, the outer wall being inclined from the vertical. To support the shaft E horizontally, the outer bracket unit or asembly C comprises an attaching plate proper 22 and a sleeve housing 23, see Figs. 1, 6 and 7. The plate 22, disposed generally horizontally, is adapted to be secured to the outer metal wall 20 by self-threading screws 24 and, centrally, is provided with an outwardly extended hub section 25 centrally apertured for reception of the sleeve housing 23. On its interior, the hub section is provided with horizontally aligned, open-sided trunnion bearings 26—26 with which cooperate trunnions 27—27 formed on the exterior of the inner end 123 of the housing 23. The inner edges 28 of the sides of said inner sleeve end 123, are made concentric with the axis of the trunnions 27 and serrated as best shown in Figs. 1 and 6. As clearly shown in said Figs. 1 and 6, the radius of said serrated edges 28 is such that said serrated edges project inwardly beyond the inside or wall contacting face of the plate 22.

With the articulated bracket C construction so far described, it will be seen that, regardless of the deviation of the supporting wall 20 from the vertical, the sleeve member 23 can be adjusted to a horizontal position by movement about the axis of trunnions 27 and securely held in such adjusted position by engagement of the serrated edges 28 with and indentation of the wall 20 when the plate 22 of the bracket unit C is screwed home. As will be evident to those skilled in the art, the bracket unit C thus provides means of universal adaptability to all surfaces to provide horizontal disposition of a supporting shaft or the like, thereby reducing the cost of application and the number of parts required to be carried in stock.

The cooperable bracket assembly D on the inner side of the door or other structure, comprises, as shown, an attaching plate proper 29; a bearing member 30; friction element 31; spring 32 and adjusting nut 33.

The plate 29 is adapted to be secured to the wall 21 also by self-threading screws 34 and has a centrally disposed inwardly extended retainer shell 35 which, at its inner end is partially spherical. The bearing member 30 is also of partial spherical formation as shown in Figs. 1 and 8. To permit the bearing member 30 to adjust itself within the shell 35 about a horizontal axis to thus obtain alignment with the sleeve member 23 of the outer bracket unit C and, at the same time prevent the bearing member 30 from rotating bodily, the shell 35 is provided with diametrically, vertically disposed shallow grooves 36 on its interior with which cooperate lugs 37 on the bearing member 30. The latter is yieldingly held in inwardly projected position by the spring 32 interposed between it and the adjacent wall 21 as shown. To frictionally retain the shaft E in any rotated position, the friction element 31 is employed, the same preferably comprising a longitudinally slit sleeve or bushing having wedge sections 38 at its end nearest the wall 21, cooperable with a corresponding wedge formation 39 on the interior of the bearing member 30. At its other end, the sleeve is threaded to cooperate with the nut 33 which bears against the member 30 so that the degree of friction exerted on hollow shaft E can be regulated as will be understood.

Rotative movement is given to the shaft E by the handle unit B which, as shown, includes a casting 40 telescoped over the adjacent end of shaft E and rigidly united thereto by pin 41 as best indicated in Figs. 1 and 10. The casting 40 has a right angled, hollow extension 42 on which is rotatably journalled a knurled handle proper 43 to rotate about an axis perpendicular to the axis of shaft E. Bodily swinging of handle 43 in a vertical plane as indicated in Fig. 1 obviously will turn the shaft E about its axis and this, in turn, will effect similar movement of the lamp head A, considered as a unit, as now about to be described.

The lamp head A, as best shown in Figs. 1 and 3, includes a lamp shell 44, and a saddle casting 45. Another bearing casting 46, having a tubular section 146 aligned with the sleeve housing 23 of the bracket-asembly C, is secured to the outer end of shaft E as hereinafter described and may be considered as an extension of said shaft E. Said tubular section 146 has an extension 246 of reduced diameter enterable within the cylindrical, thickened, bearing section 223 at the outer end of the sleeve housing 23. The reduced section 246, as will be evident, produces an annular shoulder 346 which bears against the end of housing 23 when the parts are assembled as shown. The casting 46 is rigidly secured to the shaft E preferably by being telescoped over the latter and having a knurled driving fit therebetween as indicated best at 47 in Fig. 1.

To hold the lamp head A and shaft E assembly against endwise shift after being mounted in the bracket units C and D, the following construction is preferably employed, reference being had to Figs. 1, 6 and 7. On the inner end of the reduced section 246 is a peripheral lug or shoulder 446 which is adapted to be entered through a corresponding, longitudinal slot 323 cut in the bearing section 223 of the bracket sleeve 23 and, when given a half turn as best indicated in Fig. 7, will engage snugly against the bearing section 223 thus forming, with shoulder 346, a bayonet slot connection between the casting 46 and bracket sleeve 23.

To effect rotation of the lamp head A about an axis disposed at right angles to the axis of shaft E and thereby provide the universal adjustment of the light beam, the following construction is preferably employed, referring to Figs. 1, 3, 4, 5, and 10.

The operating handle 43 has secured thereto and extending therefrom within the extension 42, a shaft 48 having a bevel gear 49 thereon cooperating with another bevel gear 50. A coil spring 51 is preferably interposed between the gear 49 and a shoulder on the extension 42 to insure constant meshing of the bevel gears and to take up any wear, as will be understood. The gear 50 is rigidly united with the adjacent end of a hollow shaft 52 journaled within and extending lengthwise of shaft E. The opposite end of shaft 52 carries a bevel gear 53 rotatably disposed within bearing casting 46, an expansion spring 54 being interposed between said gear 53 and the adjacent shoulder formed at the outer end of shaft E to take up any slack or wear. Said gear 53 cooperates with another bevel gear 55 preferably formed integrally with the saddle casting 45 of the lamp head A. From the foregoing description, it will be seen that rotation of operating handle 43 about its axis, in either direction, will produce a corresponding rotation of the lamp head A about its axis disposed at right angles to the axis of shaft E and that the amount of rotation is unlimited.

Heretofore, in dirigible lights of the class herein referred to, a great deal of difficulty has been encountered in an effort to maintain a satisfactory rotary mounting of the lamp head at the outer end of the horizontal shaft or other support. After relatively short service, former constructions have become loose, wabbly and noisy. In the present invention, these disadvantages are overcome by the following described construction, particular reference being had to Figs. 1, 3, 4 and 5.

The outer end of casting 46 is vertically apertured as viewed in Fig. 3, and is formed with a relatively large diameter, horizontal bearing 56 with which cooperates a corresponding bearing face on the saddle casting 45. The casting 46, at its bottom as viewed in Fig. 3, is formed with a second bearing 57 with which cooperates an annular bearing flange 58 on the lower end of a stud bolt 59. The latter has an upstanding shank 60 which, for the greater part of its length, is of generally cylindrical form with a flat side 61, and at its upper end is of reduced diameter and threaded as indicated at 62. Said shank 60 is extended loosely through gear 55 but with which it has non-rotative engagement as best indicated in Fig. 4. Also carried by the shank of the stud bolt are two washers 63 and 64 between which is clamped a spring metal spider 65, the fingers of which bear on the upper face of gear 55. As evident, washers 63 and 64 and spider 65 are all held tightly clamped by nut 66. With the construction just described, it will be seen that a constant uniform spring tension will be maintained on the stud bolt urging it in contact with bearing 57 and, simultaneously, gear 55 will be urged downwardly with the same degree of pressure into contact with bearing 56. In this manner, looseness, wabbling and rattle are successfully eliminated and any wear on the bearing surfaces at 57 and 56 will always be taken up automatically. To provide dust and/or oil seals, gaskets 67 and 68 are preferably employed at the bearing surfaces at 56 and 57 respectively.

The improved electrical system is provided as follows, it being understood that a one side ground circuit is employed. The live wire, from a battery is indicated at 69 and is entered through a suitable opening in the handle casting 40, see Fig. 10, and its end soldered or otherwise rigidly connected to a metal contact plug 70 mounted in a block 71 of insulating material mounted in the outer end of casting 40.

To insure that block 71 is applied to casting 40 in the proper position, said block and casting are formed with cooperating sets of ribs and grooves 140 and 240 of different width as shown in Fig. 13. Secured to the outer end of handle casting 40, as by screws 71', is a preferably sheet metal housing 72 of approximately three quarter spherical form. Within said housing 72 is a specially shaped and formed switch or switch block 73 of insulating material. Said switch is likewise of approximately three quarter spherical form with a finger piece 74 projecting therefrom, the finger piece working in a slot 75 cut in the housing 72, as shown. On its interior, the switch 73 is provided with a channel 76 extending diametrically lengthwise thereof. Along one side of channel 76 is a communicating slot 77, both the channel and slot opening onto the flat face 78 of the switch block 73. Seated within channel 76 is a specially formed leaf or plate spring having convex and concave bearing contact ends 79 and 79' respectively, united by a main section 80 of loop formation. The main spring section 80 has a lateral lug or projection 81 so located that it slides within groove 77 for the purpose hereinafter described. The groove 77 and cooperating lug 81 are provided to insure that the spring 79, 79', 80 be inserted within the channel 76 in the intended correct manner, as will be apparent.

With the assembled switch block 73 and spring positioned within the housing 72 and the switch turned to the position shown in Figs. 10 and 11, it is evident that contact end 79 is in electrical contact with live wire plug 70 and the other contact end is in electrical contact with the rounded projecting end 82 of a contact pin 83 loosely mounted to slide axially of the insulating block 71. When the switch block 73 is shifted by finger piece 74 to the position shown in Fig. 12, it is evident that the circuit is broken at the elements 70 and 79 although contact and spring pressure are maintained at 79' and 82.

Referring to Figs. 3 and 10, it will be seen that, within the hollow shaft 52 and projecting beyond each end thereof is a loose, floating conducting metal rod 84 having a coating of insulation 85 thereon. Said rod 84, as shown in Fig. 10, is in end to end contact with said longitudinally slidable pin 83 and hence under the spring pressure or influence of spring 79, 79', 80. At its opposite end, floating insulated rod 84, 85 is in electrical contact with a metal commutator 86 mounted on an insulating bushing 87 in turn non-rotatably mounted on the shank 60 of the stud bolt constituting a part of the lamp head, said bushing and commutator being located between the gear 55 and bearing flange 58. As shown in Fig. 3, the shank 60 is axially bored as indicated at 90 with a lateral extension at its lower end leading through insulating bushing 87 to the commutator 86. Soldered to commutator 86 is the end of insulated wire 91 which leads up through bore 90 and is attached to one of the terminals for the bulb of the sealed beam light disposed within the shell 44.

From the preceding description, it will be seen that a continuous commutator contact is provided for conducting the current to the lamp head and that such contact is present regardless of the number of rotations of the lamp head about its individual axis. Furthermore, the conductor rod 84, 85 is free to float not only lengthwise of the operating shaft 52 but is independent of the rotation of the shaft 52, thus simplifying to the utmost, the number of parts, and assembling of the conductor from the handle unit to the lamp head assembly. Particular attention is also directed to the single or unitary spring 79, 79', 80 which serves to make and break the circuit; maintains the two conductor rods 83 and 84 in electrical contact and rod 84 in contact with commutator 86; creates the necessary friction between switch block 73 and shell 72 to retain the switch in its adjusted "off" or "on" position, as the case may be; and automatically serves to take up any wear of the associated parts.

The access opening at the outer end of casting 46 is detachably closed by screw plug 92 and a similar access opening in the handle casting 40 is detachably closed by another screw plug 93.

It frequently happens in dirigible lights of the character herein referred to, that continued burning of the bulb of the light produces sufficient heat to cause breakage of the glass rim of the sealed beam construction where it bears on the shell rim. To prevent this, a yieldable, spring metal supporting ring is preferably employed as shown in Figs. 1 and 2. Said ring 94 has a plurality of relatively short, radially inwardly extended fingers 95 on which the glass plate of the sealed beam light is adapted to rest to thereby compensate for such expansion as may occur from heating. Said ring is preferably formed also with an extended finger 96 which is connected to the remaining, grounded terminal for the light bulb, as shown.

From the description considered in connection with the drawings it will be seen that the number of parts has been reduced to a practical minimum; all the parts are readily assembled; adjustment for all variations of structure attachment are provided for by universally applicable bracket means; compensation for wear is automatically provided for in all those situations where wear might occur and rattle and vibration of parts eliminated; and in general, an efficiently operable light of neat and attractive appearance provided.

Although there has herein been shown and described what is now considered the preferred embodiment of the invention, the same is merely illustrative. All change and variations are contemplated that come within the claims appended hereto.

What is claimed, is:

1. In a dirigible light structure of the character described, including an elongated hollow supporting member having a lamp head rotatably mounted on one end thereof and having an operating handle at its opposite end, said light structure further including a hollow rotatable shaft disposed between said handle and head for rotating the head relative to said supporting member, said hollow shaft being rotatably mounted within said supporting member: the combination therewith of means providing an electric circuit to the lamp head and including an electrical conductor rod loosely disposed for longitudinal floating movement within and electrically insulated from said hollow shaft, a control switch movably mounted on said operating handle, said switch including a spring contact member disposed in cooperative engagement with the adjacent end of said floating conductor rod to urge the same toward said lamp head, and a rotatable electrical contact element carried by said lamp head and maintained in frictional engagement with the adjacent end of said conductor rod by said spring contact member at the opposite end thereof.

2. In a dirigible light structure of the character described, including an elongated hollow supporting member having a lamp head rotatably mounted on one end thereof and an operating handle mounted on its opposite end, said light structure further comprising means disposed between said handle and lamp head for rotating the head relative to its said supporting member, said rotating means including a hollow operating shaft rotatably mounted within said supporting member: the combination therewith of means providing an electric circuit to the lamp head and including an electrical conductor rod loosely mounted for longitudinal floating movement within and insulated from said hollow shaft, a rotatable control switch including a spring contact member mounted on said handle and cooperatively engaging the adjacent end of said rod, a rotatable contact element carried by said lamp head and frictionally engaging the opposite end of said rod, said spring contact member exerting yieldable pressure on said loosely mounted rod to move the same toward and into frictional engagement with said rotatable contact element carried by the lamp head.

3. In a dirigible light structure of the character described, having in combination with an elongated hollow supporting member, a lamp head, means journaling said lamp head at one end of said supporting member to rotate about an axis transverse to the length of said member, said journaling means including a shaft having a commutator thereon and rotatable in unison therewith, said light structure further including an operating handle at the opposite end of said supporting member, and means disposed between said handle and lamp head for effecting rotation of the latter and including a hollow operating shaft disposed within the hollow supporting member: the combination therewith of means providing an electric circuit to a light in said lamp head and including a relatively fixed terminal contact element on said supporting member adjacent said handle, an electrical conductor rod loosely disposed within and insulated from said hollow shaft, said rod having frictional electrical contact at one end with said commutator, a rotatable switch member adjacent said handle, and a conducting element carried by said switch member disposed in constant electrical contact with said rod, said conducting element being rotatable by said switch member into and out of electrical contact with said terminal contact element.

4. In a dirigible light structure of the character described, having in combination with an elongated hollow supporting member and a lamp head supported thereby, means journaling said lamp head at one end of said member to rotate about an axis transverse to the length of said member, said journaling means including a shaft element having a commutator thereon rotatable in unison therewith, said light structure further including an operating handle at the opposite end of said supporting member, and means disposed between said handle and lamp head for effecting rotation of the latter and including a hollow operating shaft disposed within said hollow supporting member: the combination therewith of means providing an electric circuit to a light in said lamp head and including a relatively fixed terminal contact element on said supporting member adjacent said handle, an electrical conductor rod loosely mounted within and electrically insulated from said hollow shaft, said rod having frictional electrical contact at one end with said commutator, a movable switch member adjacent said handle, and an electrical conducting element carried by the switch member and disposed in constant electrical circuit with said conductor rod, said conducting element being shiftable by said movable switch member into and out of electrical contact with said fixed terminal contact element, said conducting element constituting a spring member having a portion thereof constantly engaging and exerting endwise pressure on said loosely mounted conductor rod to maintain the opposite end of the latter in electrical contact with said commutator.

5. In a dirigible light structure of the character described, having in combination with an elongated hollow supporting member and a lamp head supported thereby, means journaling said lamp head at one end of said member to rotate about an axis transverse to the length of said member, said journaling means including a shaft element having a commutator thereon rotatable in unison therewith, said light structure further including an operating handle at the opposite end of said supporting member, and means disposed between said handle and lamp head for effecting rotation of the latter and including a hollow operating shaft disposed within said hollow supporting member: the combination therewith of means providing an electric circuit to a light in said lamp head and including a relatively fixed terminal contact element on said supporting member adjacent said handle, an electrical conductor rod loosely mounted for endwise floating movement within and electrically insulated from said hollow shaft, said rod having frictional electrical contact at one end with said commutator, a rotatable switch member mounted on said handle, and an electrical conducting leaf spring carried by and rotatable with the switch member, one end of said spring being disposed in constant electrical contact with said conductor rod, the opposite end of said leaf spring being shiftable by said rotatable switch member in opposite directions into and out of electrical contact with said fixed terminal contact element, said one end of said leaf spring exerting constant endwise pressure on said loosely mounted conductor rod to maintain the opposite end of the latter in electrical contact with said commutator.

CLIFFORD SKLAREK.

REFERENCES CITED

The following references are of record in the file of this patent:

UNITED STATES PATENTS

| Number | Name | Date |
|---|---|---|
| 1,385,512 | Wittig | July 26, 1921 |
| 1,691,420 | Wood | Nov. 13, 1928 |
| 1,702,772 | Gross | Feb. 19, 1929 |
| 1,756,531 | Aldeen et al. | Apr. 29, 1930 |
| 1,794,133 | Anderson | Feb. 24, 1931 |
| 1,830,355 | Farr | Nov. 3, 1931 |
| 1,906,489 | Sklarek | May 2, 1933 |
| 1,921,784 | Sklarek | Aug. 8, 1933 |
| 1,981,204 | Sklarek | Nov. 20, 1934 |
| 2,093,087 | Lynn | Sept. 14, 1937 |
| 2,362,100 | Schwartz | Nov. 7, 1944 |
| 2,393,056 | Noblitt et al. | Jan. 15, 1946 |
| 2,468,165 | Brister et al. | Apr. 26, 1949 |
| 2,485,063 | Noblitt et al. | Oct. 18, 1949 |
| 2,540,257 | Gross | Feb. 6, 1951 |